(12) United States Patent
Sasaki et al.

(10) Patent No.: US 7,143,651 B2
(45) Date of Patent: Dec. 5, 2006

(54) PRESSURE SENSOR (75) Inventors: Keiji Sasaki, Tokyo (JP); Isao Okura, Tokyo (JP)

(73) Assignee: Fujikoki Corporation, Tokyo (JP)

( * ) Notice: Subject to any disclaimer, the term of this patent is extended or adjusted under 35 U.S.C. 154(b) by 0 days.

(21) Appl. No.: 10/910,600

(22) Filed: Aug. 4, 2004

(65) Prior Publication Data
US 2005/0061080 A1    Mar. 24, 2005

(30) Foreign Application Priority Data

| Aug. 5, 2003 | (JP) | ............................. 2003-287084 |
| Sep. 9, 2003 | (JP) | ............................. 2003-317015 |
| Nov. 7, 2003 | (JP) | ............................. 2003-378446 |

(51) Int. Cl.
*G01L 9/06* (2006.01)
*G01L 7/00* (2006.01)
(52) U.S. Cl. ...................................................... 73/721
(58) Field of Classification Search ................ 73/721, 73/715
See application file for complete search history.

(56) References Cited

U.S. PATENT DOCUMENTS

| 5,257,546 A | * | 11/1993 | Tobita et al. .................. 73/727 |
| 6,148,673 A | * | 11/2000 | Brown .......................... 73/721 |
| 6,176,137 B1 | * | 1/2001 | Sasaki et al. .................. 73/754 |
| 6,457,368 B1 | * | 10/2002 | Sasaki et al. .................. 73/753 |
| 6,484,589 B1 | * | 11/2002 | Brock ....................... 73/861.18 |
| 6,612,791 B1 | * | 9/2003 | Haimer ....................... 409/232 |

FOREIGN PATENT DOCUMENTS

JP    2002-333377    11/2002

* cited by examiner

*Primary Examiner*—Max Noori
(74) *Attorney, Agent, or Firm*—Rader, Fishman & Grauer PLLC (57) ABSTRACT

A pressure sensor comprises a housing having a pressure introduction hole, a pressure detecting element formed of a semiconductor device having the piezoelectric resistance effect, a holder for fixing the pressure detecting element, and a connector case. The pressure detecting element and the holder are airtightly joined to form a pressure sensor body in which an interior space is defined. A circuit board having an electrode pad is provided on the holder of the pressure sensor body, and a connector in the connector case and the electrode pad are connected by means of an electrically conductive spring body having elasticity. The holder is supported in the housing by means of a guide frame and an O-ring.

13 Claims, 9 Drawing Sheets

PRESSURE SENSOR

BACKGROUND OF THE INVENTION

1. Field of the Invention

The present invention relates to a pressure sensor, and more particularly, to the structure of a pressure sensor which has a housing, in which a pressure detecting element is stored, and a connector case and is improved in airtightness.

2. Description of the Related Art

There have been proposed various conventional pressure sensors, such as the one described in Japanese Patent Application Laid-Open No. 2002-333377. Here, the pressure sensor disclosed in the patent document is described with reference to FIG. 9. The pressure sensor 101 comprises a housing 110, sensor element 120, holder 130, circuit board 140, spring body 150, connector case 170, and connector 180. In the pressure sensor 101, a pressure sensor body that is formed of the sensor element 120 and the holder 130 is housed in a container that is formed of the housing 110 and the connector case 170.

Figure 9:
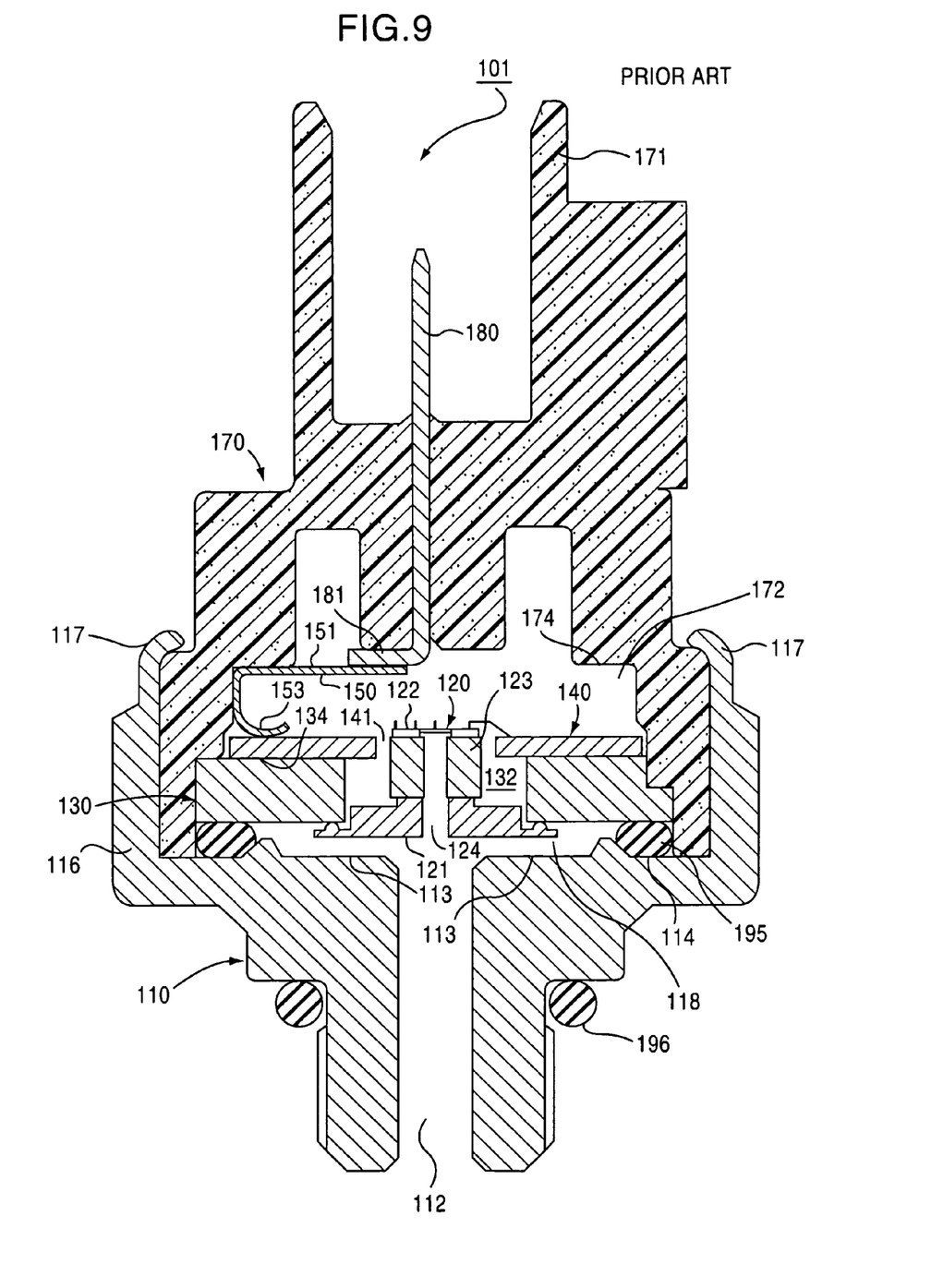
FIG. 9 is a longitudinal sectional view of a prior art pressure sensor.

The housing 110 has a fluid inlet hole 112 through which a fluid is introduced into its lower part. A circular housing base portion 113 is formed on the top part of the inlet hole 112. The housing 110 also has an annular groove 114, a peripheral wall 116 that rises from the outer periphery of the groove 114, a thin-walled crimp portion 117 on the upper end part of the wall 116, and a housing interior space 118 defined by the base portion 113 and the wall 116. The fluid inlet hole 112 and the interior space 118 of the housing 110 communicate with each other.

Further, the sensor element 120 has a function to detect pressure. It is composed of a header 121, a pressure detecting element 122, and a pedestal 123. The detecting element 122 is formed of a semiconductor device in which a plurality of resistors having the piezoelectric resistance effect are formed like a bridge on the top surface of a semiconductor substrate. The pedestal 123 is airtightly fixed on the top surface of the header 121. Sensor element openings 124 that reach the bottom of the detecting element 122 are provided individually in the respective central parts of the header 121 and the pedestal 123.

The semiconductor substrate that forms the pressure detecting element 122 has a rectangular plane shape and is formed with a diaphragm portion. The central part of the diaphragm portion is thinned so that it can be deformed under pressure. A plurality of piezoelectric resistance elements are formed like a bridge on the top surface of the diaphragm portion, whereby a pressure sensing section is formed as a strain gage. Further, electric circuits, such as an amplifier, arithmetic processing circuit, etc., which are manufactured by the IC manufacturing technology, are arranged on a thick-walled portion at the peripheral part.

The holder 130 has a holder opening 132 in the center. The circuit board 140 is fixed on a top surface 134 of the holder 30 with an adhesive or the like. It is in the shape of a disk and has a circuit board opening 141 in its center in which the pressure detecting element 122 of the sensor element 120 is situated.

Furthermore, one end 151 of the spring body 150 is fixed to a lower end part 181 of the connector 180, and its other end side is bent downward and forms a curved portion 153. The connector case 170 is a resin case in which the connector 180 is fixedly inserted. It has a socket portion 171 at its upper part. A first O-ring 195 is inserted in an O-ring receiving groove 114 and prevents water or moisture from externally getting into an interior space 172 of the connector case 170. A second O-ring 196 is fitted on that part of the housing above a thread portion, whereby airtightness between the housing and a pipe is maintained.

According to the prior art described above, the structure at the junction between the pressure sensor body and the connector is simple and requires only a small amount of assembly work, so that the manufacturing cost can be reduced. However, the airtightness should be further improved to maintain the durability and sensitivity of the pressure sensor.

OBJECT AND SUMMARY OF THE INVENTION

The object of the present invention is to improve the airtightness of a junction between a pressure sensor body and a connector.

A pressure sensor according to the present invention comprises a housing having a pressure introduction hole, a pressure detecting element formed of a semiconductor device having the piezoelectric resistance effect, a holder for fixing the pressure detecting element, and a connector case, the pressure detecting element and the holder being airtightly joined to form a pressure sensor body in which an interior space is defined. A circuit board having an electrode pad is provided on the holder of the pressure sensor body, a connector in the connector case and the electrode pad are connected by means of an electrically conductive spring body having elasticity, and the holder is supported in the housing by means of a guide frame and an O-ring.

The pressure sensor according to the invention may assume the following aspects.

The holder is located in the connector case with an O-ring on the side face thereof.

The guide frame has an L-shaped profile formed of a rising portion interposed between the pressure sensor body and the connector case and a horizontal portion engaging and supporting the holder.

The guide frame has a square profile, and the top surface of the guide frame engages and supports the holder. That part of the holder in engagement with the guide frame has a lower support portion formed extending on the outer peripheral side.

The connector projects from the connector case in a manner such that a waterproof filler is located in an area for the projection.

A fluid oozes out of the connector case rather than gets into the interior space through a gap on the inner surface of the connector case. The guide frame has a release groove of a given depth formed penetrating a part of a bottom face thereof.

The connector case has therein an air inlet hole fitted, at an end portion thereof, with a seat member continuously porous in the thickness direction thereof.

The seat member is in the form of a circular sheet, and is located on the inlet or outlet side of the air inlet hole. Further, the seat member is formed of polytetrafluoroethylene resin.

In the pressure sensor according to the present invention constructed in this manner, its body has improved airtightness inside and its general configuration is simple.

BRIEF DESCRIPTION OF THE DRAWINGS

The foregoing and other objects and feature of the invention will become apparent from the following description of preferred embodiments of the invention with reference to the accompanying drawings, in which.

DETAILED DESCRIPTION OF THE PREFERRED EMBODIMENTS

First to third embodiments of the present invention will now be described with reference to the accompanying drawings. Although adjectives "upper" and "lower" will be used in the description to follow, actual arrangement of components is not limited to positional relations represented by those words.

Figure 1:
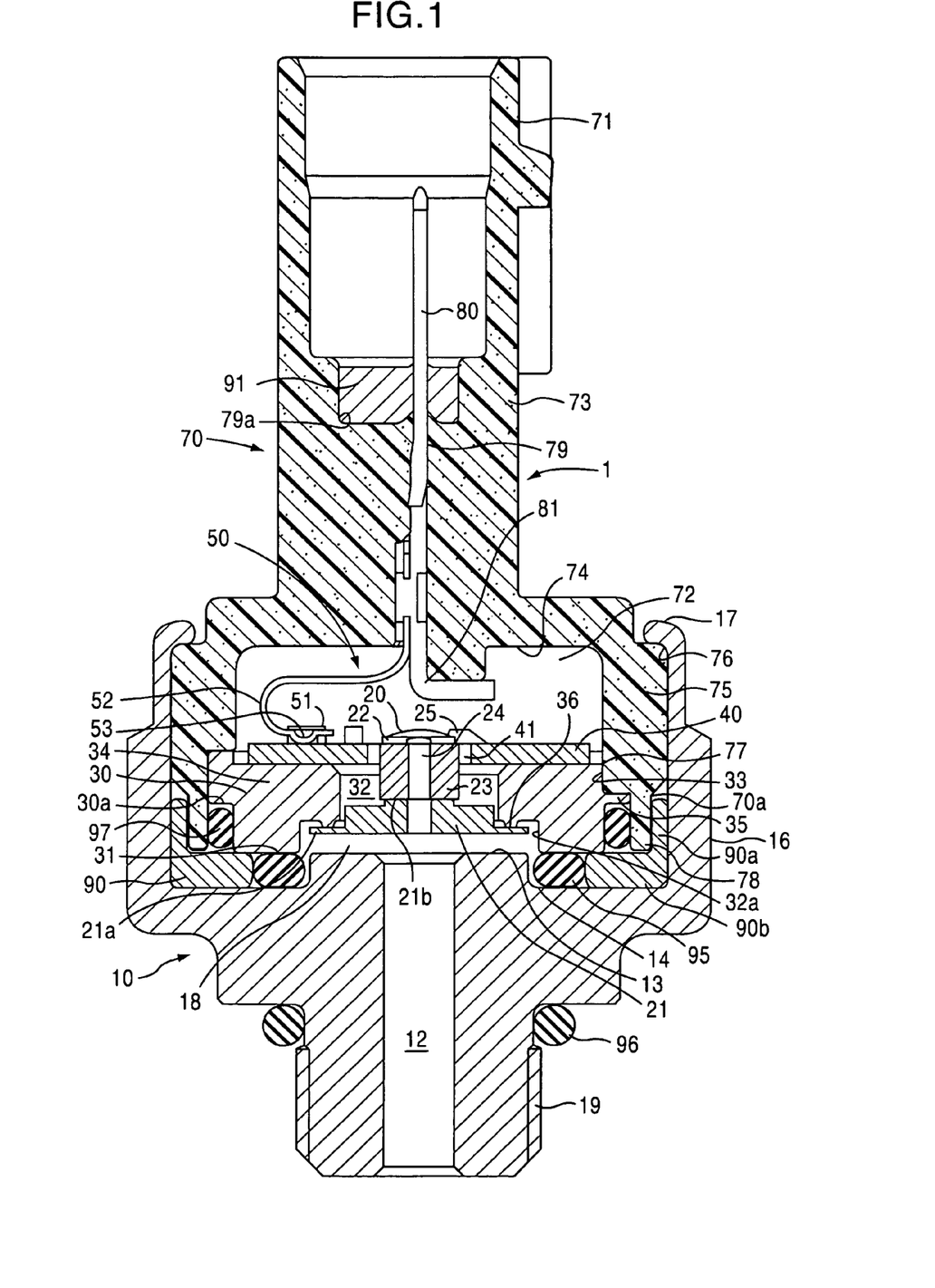
FIG. 1 is a longitudinal sectional view of a pressure sensor according to a first embodiment of the invention.

The first embodiment of the invention will first be described with reference to FIG. 1.

A pressure sensor 1 according to the first embodiment of the invention comprises a housing 10, sensor element 20, holder 30, circuit board 40, spring body 50, connector case 70, and connector 80. In the pressure sensor 1, a pressure sensor body that is formed of the sensor element 20 and the holder 30 is housed in a container that is formed of the housing 10 and the connector case 70.

The housing 10 is a substantially cylindrical structure of aluminum, for example. The housing 10 comprises a fluid inlet hole 12 through which a fluid is introduced into its lower part, a circular housing base portion 13 formed on the top part of the inlet hole 12, and an annular recess or groove 14 formed of the peripheral part of the base portion 13. The housing 10 further comprises a peripheral wall 16 that rises from the outer periphery of the groove 14, a thin-walled crimp portion 17 on the upper end part of the wall 16, and a housing interior space 18 defined by the base portion 13 and the wall 16.

The annular groove 14 serves as a receiving portion (insertion portion) for a first O-ring 95 and a guide frame 90, which will be mentioned later. The fluid inlet hole 12 and the interior space 18 of the housing 10 communicate with each other. A thread portion 19 is formed on the circumference of the inlet hole 12 of the housing 10. A pipe (not shown) on the measured-pressure side is screwed onto the thread portion 19, and the housing 10 is airtightly fixed to the pipe.

The sensor element 20 has a function to detect pressure. It is composed of a metallic header 21, a pressure detecting element 22, and a silicon pedestal 23. The detecting element 22 is formed of a semiconductor device in which a plurality of resistors having the piezoelectric resistance effect are formed like a bridge on the top surface of a semiconductor substrate. The pedestal 23 is airtightly fixed on the top surface of the header 21. Sensor element openings 24 that reach the bottom of the detecting element 22 are provided individually in the respective central parts of the header 21 and the pedestal 23. The pedestal 23 is placed and fixed airtightly on a top surface 21b of the header 21. The pressure detecting element 22 is placed and fixed on the top surface of the pedestal 23 so that its top surface carries the resistors thereon. A collar portion 21a is located around the lower part of the header 21.

The pressure detecting element 22 has a diaphragm portion formed on its rectangular semiconductor substrate. The central part of the diaphragm portion is thinned so that it can be deformed under pressure. A plurality of piezoelectric resistance elements are formed like a bridge on the top surface of the diaphragm portion, whereby a pressure sensing section is formed as a strain gage. Further, electric circuits, such as an amplifier, arithmetic processing circuit, etc., which are manufactured by the IC manufacturing technology, are arranged on a thick-walled portion at the peripheral part. A land portion (reference numerals not denoted) on the top surface of the pressure detecting element 22 and a land portion on the top surface of the circuit board 40 are connected by means of a bonding wire 25. For example, the pedestal 23 is rectangular in plane shape and has the sensor element opening 24 in the center. A gold plating layer (not denoted) is formed on the joint surface of the silicon pedestal 23 on the header 21 by gold sputtering or the like.

The header 21 is formed of an iron-nickel alloy, such as 42 alloy, commonly known as a Fe-Ni alloy containing 42% of Ni. It is circular in plane shape and has the sensor element opening 24 in the center. A gold plating layer (not shown) is formed on the joint surface of the header 21 on the pedestal 23. The respective sensor element openings 24 of the pedestal 23 and the header 21 are arranged on the same axis and communicate with the fluid inlet hole 12 of the housing 10. Thus, the compressed fluid can be guided into an interior space 72 that is defined by the holder 30 and a connector case 70. The undersurface of the pressure detecting element 22 is airtightly fused to the top surface of the pedestal 23. The undersurface of the pedestal 23 and the top surface of the header 21 are airtightly fused to each other by thermocompression bonding (scrubbing) with a gold-silicon alloy as a brazing material between them.

The holder 30, along with the connector case 70, defines the interior space 72. The holder 30 is formed of stainless steel, for example, and has a holder opening 32 in the center. A positioning notch portion 33 for positioning the connector case is formed in a part of the periphery of the holder 30. A large-diameter opening portion 32a is formed in the lower part of the holder opening 32 of the holder 30. A downwardly projecting ridge portion 36 is formed in a ring on the ceiling of the opening portion 32a. Further, a notch portion 30a is formed on the outer peripheral side of an undersurface 31 of the holder 30, and a third O-ring 97 is fitted in the notch portion 30a. A pressed portion 35 is formed covering a given angle between the notch portion 30a and the positioning notch portion 33.

The circuit board 40 is fixed on a top surface 34 of the holder 30 with an adhesive or the like. The circuit board 40 is formed of an insulating printed wiring board, such as an alumina board, substantially in the shape of a disk. It has a circuit board opening 41 in its center in which the pressure detecting element 22 of the sensor element 20 is situated. Arranged on the surface of the circuit board 40 are electrode pad (reference numeral not denoted), land portion (reference numeral not denoted), printed wiring, and circuit element. The electrode pad is formed of a gold pad that fetches signals to the outside. The land portion is formed of a gold pad to which the bonding wire 25 from the pressure detecting element 22 is connected. The printed wiring and the circuit element constitute a circuit that amplifies, computes, and delivers electric signals from the detecting element 22.

The spring body 50 is in contact with the electrode pad that serves as an input/output terminal on the circuit board 40. Thus, the circuit board 40 is connected to the connector 80 by means of the spring body 50, and is provided in association with signal conductors, power supplying lines, and grounding conductor. The spring body 50 is formed of an electrically conductive elastic material, such as phosphor bronze. The spring body 50 is fixed to a lower end part 81 of the connector 80 by spot welding or the like, and its middle part is bent downward and forms a bent portion 52. A curved portion 53 is formed near one end 51. That surface of the curved portion 53 which touches the electrode pad is partially gilded. That part of the spring body 50 which ranges from the one end 51 to the bent portion 52 is supported by the circuit board 40. When the connector case 70 is fixed to the housing 10 by crimping, the spring body 50 acts so as to press the curved portion 53 against the electrode pad.

The connector case 70 is a resin case in which the connector 80 is fixedly inserted, and has a socket portion 71 at its upper part, the interior space 72 that underlies the socket portion 71 and serves as a reference space, an upper peripheral wall 73 that hangs downward, the undersurface 74 of the wall 73, a lower peripheral wall 75 that hangs downward from the upper peripheral wall 73, a crimp shoulder portion 76 on the upper outside part of the wall 75, a positioning portion 77 on the inner surface of the wall 75, a guide frame engaging portion 78 which is formed of a thin-walled lower part of the wall 75, and a connector insertion hole 79 through which the connector 80 is passed for retention. The connector 80 is inserted into the hole 79 from below and fixed therein.

The connector case 70 can be changed in shape to be compatible with connectors of various different shapes. In the connector 80, the power supplying lines and the grounding conductor are used for power supply to an electric circuit, and the grounding conductor and the signal conductors are used to fetch output signals of the sensor element 20.

The guide frame engaging portion 78 is formed on the lower part of the lower peripheral wall 75 of the connector case 70. Its outer periphery is formed as an outer peripheral small-diameter portion 70a. A rising portion 90a of the guide frame 90 (mentioned later) is fitted on the small-diameter portion 70a. The lower part of the engaging portion 78 abuts against the top surface of a horizontal portion 90b of the guide frame 90. A filling recess 79a is formed to a given depth in the connector case 70. After the connector 80 is located in the connector case 70, a waterproof filler 91 formed of an adhesive (e.g., silicon) is filled into the filling recess 79a, whereby penetration of rainwater or the like can be prevented.

The ring-shaped guide frame 90 having an L-shaped profile is fitted in the annular groove 14 of the housing 10 so as to be inscribed in the inner surface of the peripheral wall 16. The rising portion 90a of the guide frame 90 is located on the outer surface of the outer peripheral small-diameter portion 70a. Overlying the top surface of the horizontal portion 90b of the guide frame 90, the third O-ring 97 is located in the notch portion 30a. On the inner peripheral part of the horizontal portion 90b, moreover, the first O-ring 95 is located in the annular groove 14. The first O-ring 95 prevents water or moisture from externally getting into the interior space 72 of the connector case 70. A second O-ring 96 is fitted on that part of the housing 10 above the thread portion 19, whereby airtightness between the housing 10 and the pipe is maintained.

The following is a description of steps of procedure for assembling the pressure sensor 1 with use of those components.

(Step 1)

First, the sensor element 20, which is assembled by fixing a laminate of the pressure detecting element 22 and the pedestal 23 on the header 21, is inserted into the holder opening 32 of the holder 30 from below so that the top surface of the collar portion 21a of the header 21 engages the ridge portion 36 of the holder undersurface 31. Thereafter, a ring-shaped projection electrode is pressed against the ridge portion 36 so that the header 21 is airtightly welded and fixed to the ridge portion 36. Further, the third O-ring 97 is fitted into the notch portion 30a at the lower part of the outer peripheral portion of the holder 30.

(Step 2)

After the circuit board 40 is then fixed on the top surface 34 of the holder 30 with the adhesive, the respective land portions of the pressure detecting element 22 and the circuit board 40 are connected by means of the bonding wire 25 of gold. The guide frame 90 and the first O-ring 95 are placed in the annular groove 14 of the interior space 18 of the housing 10. Then, a pressure sensor assembly that is formed of the sensor element 20, holder 30, and circuit board 40 is set on the frame 90 and the ring 95.

(Step 3)

Subsequently, the connector 80, having the spring body 50 fixed on its lower end part 81, is inserted into the connector insertion hole 79 of the connector case 70. Thereafter, the waterproof filler 91, e.g., silicon, is filled into the filling recess 79a at the upper part of the connector case 70 and hermetically sealed, and the case 70 is then assembled.

(Step 4)

After a terminal fixed to the connector case 70 is then positioned so that the curved portion 53 of the spring body 50 that is fixed to the connector 80 is located over the electrode pad of the circuit board 40, the case 70 is inserted into the interior space 18 of the housing 10. As this is done, the guide frame engaging portion 78 is inserted between the end edge of the pressed portion 35 and the third O-ring 97, on the inside, and the rising portion 90a on the outside so that it abuts against the horizontal portion 90b. When the insertion is finished, the connector case 70 is fixed to the housing 10 in a manner such that the crimp portion 17 at the upper end of the peripheral wall 16 of the housing 10 is fixed on the crimp shoulder portion 76 of the case 70 by crimping.

In Steps 1 to 4 described above, the pressure sensor 1 is assembled including the connector 80 and the electrode pad connected electrically to each other.

After the pressure sensor assembly is positioned in the housing 10, according to this invention, the connector case 70 is put onto the assembly from above, and the crimp portion 17 of the housing is crimped. By doing this, the pressure sensor for gage pressure can be easily manufactured having an airtight fluid introduction space. The holder 30, in particular, is steadily supported and sealed by the horizontal portion 90b and the first O-ring 95 from below. The pressed portion 35 is pressed and supported by a step portion of the lower peripheral wall 75 from above. From both sides, moreover, the holder 30 is supported by the positioning portion 77 and the inner peripheral surface of the guide frame engaging portion 78. Accordingly, the holder 30 can be restrained from floating, and besides, is jointly sealed by the first O-ring 95, guide frame 90, third O-ring 97, etc. Thus, a stable, highly hermetic state can be maintained, and the interior space 72 can be persistently kept highly airtight.

Figure 2:
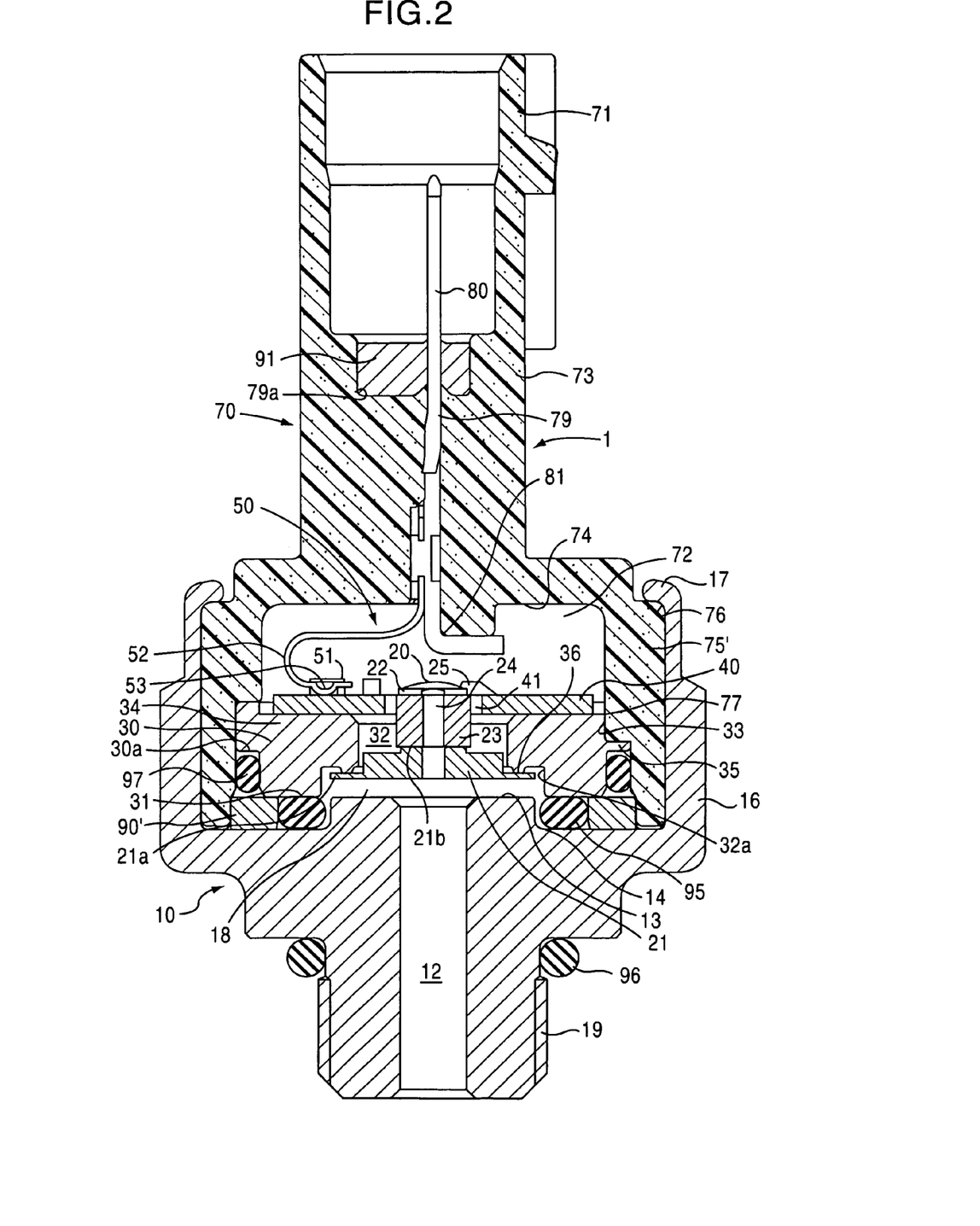
FIG. 2 is a longitudinal sectional view of a pressure sensor according to a second embodiment of the invention.

A second embodiment of the invention will now be described with reference to FIG. 2. In the description of the second embodiment shown in FIG. 2 to follow, like numerals are used to designate like components that are identical with ones according to the first embodiment shown in FIG. 1, and a description of those components is omitted.

In the second embodiment, a guide frame 90' is formed having a square profile, and unlike in the first embodiment, therefore, is not provided with the rising portion 90a. The outer peripheral portion of the guide frame 90' is touched and supported by the inside of a lower peripheral wall 75' of a connector case 70. The top surface of the guide frame 90' is touched and supported by an undersurface 31 of a holder 30.

Arranged in this manner, the second embodiment has an effect such that the configuration of the guide frame 90' is simple, besides the effects of the first embodiment.

Figure 3:
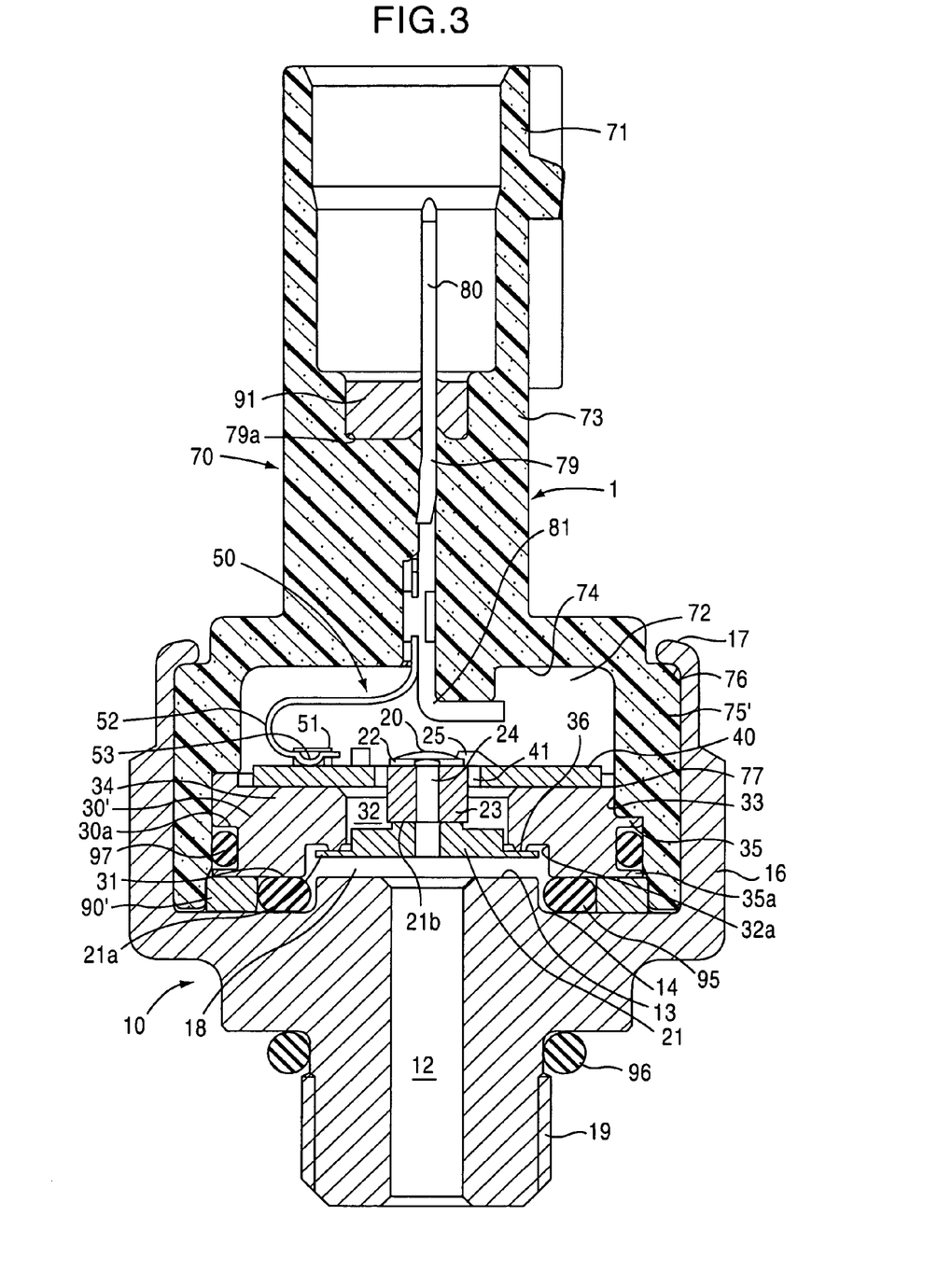
FIG. 3 is a longitudinal sectional view of a pressure sensor according to a third embodiment of the invention.

A third embodiment of the invention will now be described with reference to FIG. 3. In the description of the third embodiment shown in FIG. 3 to follow, like numerals are used to designate like components that are identical with ones according to the first or second embodiment shown in FIG. 1 or 2, and a description of those components is omitted.

In the third embodiment, a guide frame 90', like that of the second embodiment, is formed having a square profile, and its outer peripheral portion is touched and supported by the inside of a lower peripheral wall 75' of a connector case 70. The top surface of the guide frame 90' widely touches an undersurface 31 of a holder 30', thereby supporting the holder 30'.

Arranged in this manner, the third embodiment has an effect such that the holder 30' can be supported with higher reliability, besides the effects of the second embodiment.

Figure 4:
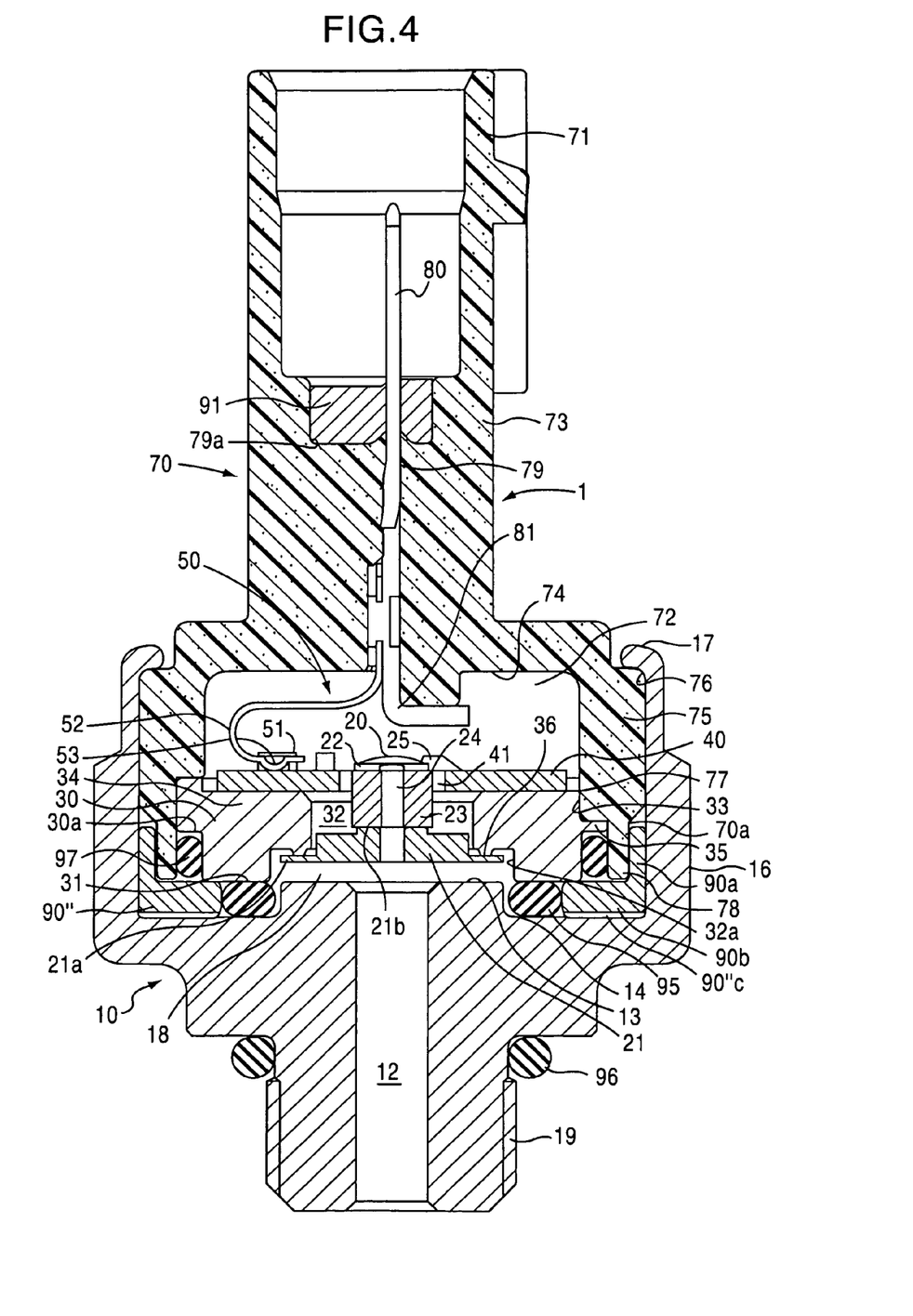
FIG. 4 is a longitudinal sectional view of a pressure sensor according to a fourth embodiment of the invention.

A fourth embodiment of the invention will now be described with reference to FIGS. 4, 5A and 5B. In the description of the fourth embodiment shown in FIG. 4 to follow, like numerals are used to designate like components that are identical with ones according to the first or second embodiment shown in FIG. 1 or 2, and a description of those components is omitted.

Figure 5A:
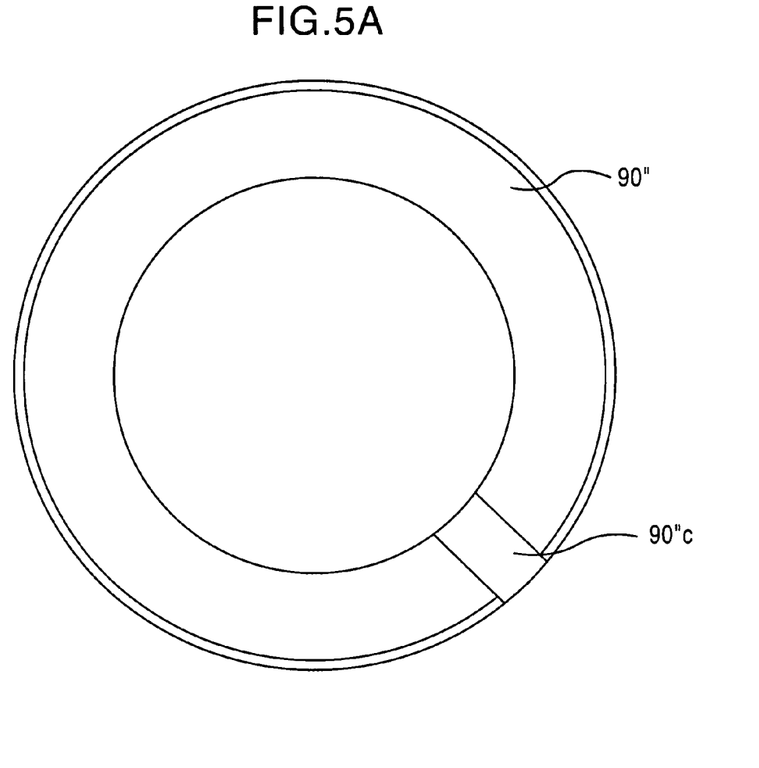
FIG. 5A is a bottom view showing a principal part of the pressure sensor shown in FIG. 4.
Figure 5B:
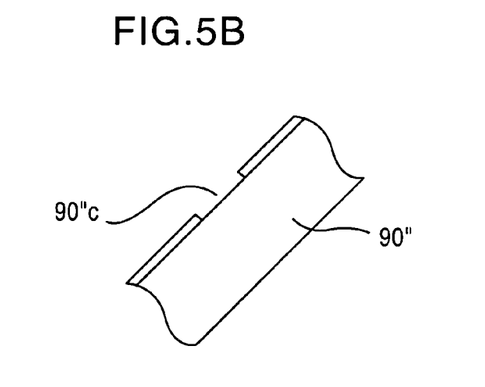
FIG. 5B is a partial side view of the pressure sensor shown in FIG. 4.

As shown in FIGS. 5A and 5B, the fourth embodiment is characterized in that a release groove 90" of a given depth is formed penetrating a part of a ring-shaped bottom face of a guide frame 90" from outside and inside in a radial direction. With this arrangement, a high-pressure fluid on the side of the fluid inlet hole (pressure introduction hole) 12 may possibly pass through the peripheral portion of the guide frame 90" and reach the lower peripheral wall 75 of the connector case 70. Even in this case, however, the fluid oozes out of the connector case 70 through the low-resistance release groove 90"c rather than gets into the interior space 72 through a gap on the inner surface of the lower peripheral wall 75. Accordingly, there is no possibility of the fluid reaching the interior space 72.

According to the fourth embodiment, one groove is formed as the release groove 90"c. It is necessary, however, only that there be means for allowing the fluid to ooze out of the connector case 70 without getting into the interior space 72 through the gap on the inner surface of the lower peripheral wall 75. It is to be understood, therefore, that the groove may be replaced with any other suitable structure.

Although the fourth embodiment has been described as being applied to the guide frame 90 of the first embodiment, it is also applicable to the guide frame 90' according to the second or third embodiment.

Any of the pressure sensors according to the first to fourth embodiments may be designed so that the air can be introduced into the interior space 72. The following is a description of fifth and sixth embodiments for this configuration.

Figure 6:
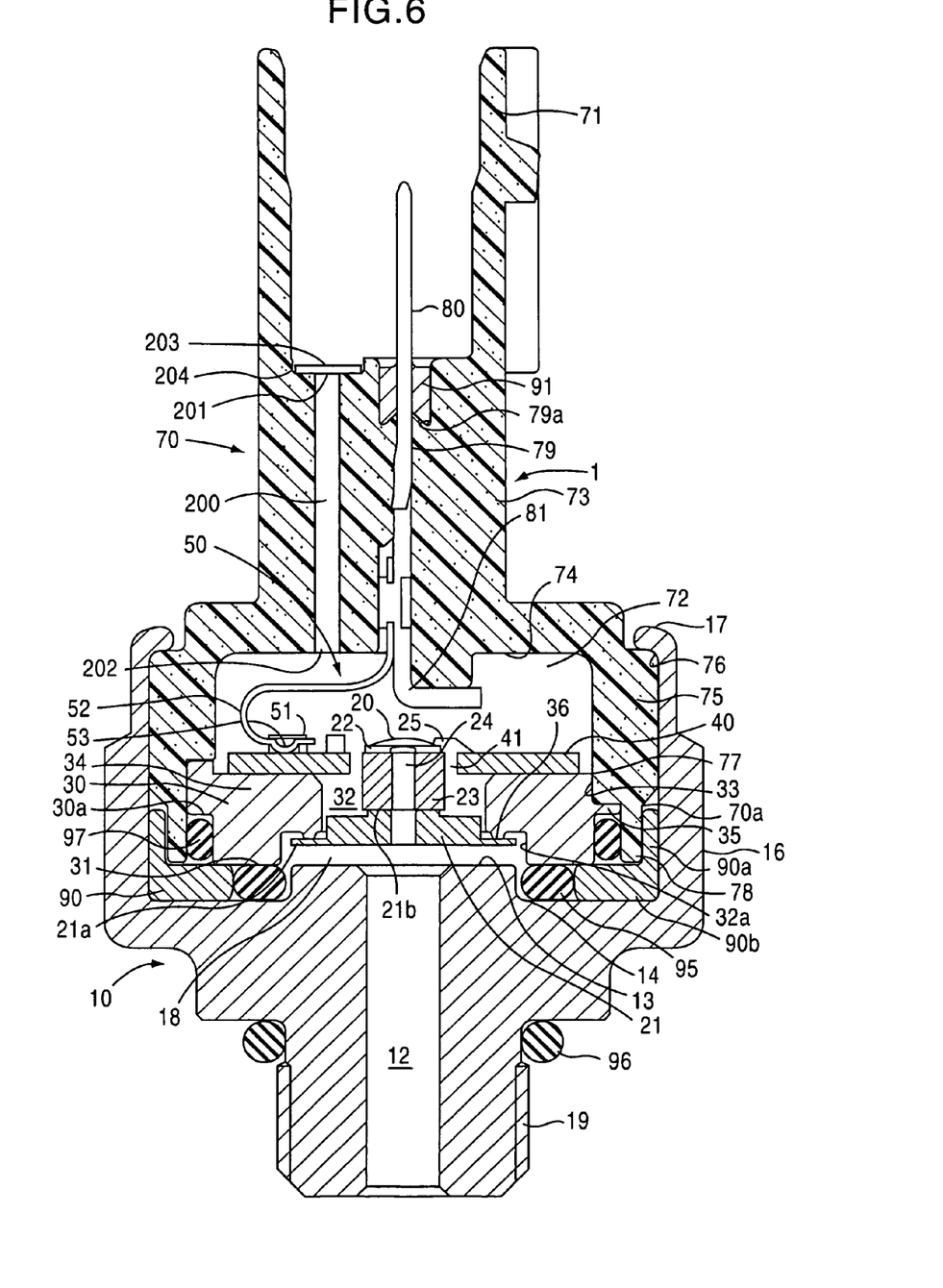
FIG. 6 is a longitudinal sectional view of a pressure sensor according to a fifth embodiment of the invention.

The fifth embodiment of the invention will first be described with reference to FIGS. 6 and 7. A pressure sensor shown in FIG. 6 is an equivalent of the pressure sensor of the first embodiment in which the connector case 70 is provided with an air inlet hole 200 for the introduction of the air. In the description of the fifth embodiment shown in FIG. 6 to follow, like numerals are used to designate like components that are identical with or equivalent to ones according to the first embodiment shown in FIG. 1, and a description of those components is omitted.

As shown in FIG. 6, the air inlet hole 200 is formed in the connector case 70, extending from the outside toward an interior space 72. One end (upper end as in FIG. 6) of the hole 200 forms an inlet side 201 that communicates with the outside, while an outlet side 202 at the other end opens into the interior space 72. A seat member 203 in the form of a circular sheet that is continuously porous in its thickness direction is mounted on the inlet side 201 of the hole 200 or on the atmosphere side of the hole 200.

The seat member 203 is formed of, for example, GORE-TEXR (trademark of Japan Gore-Tex Inc.), which is based on polytetrafluoroethylene (PTFE).

Figure 7:
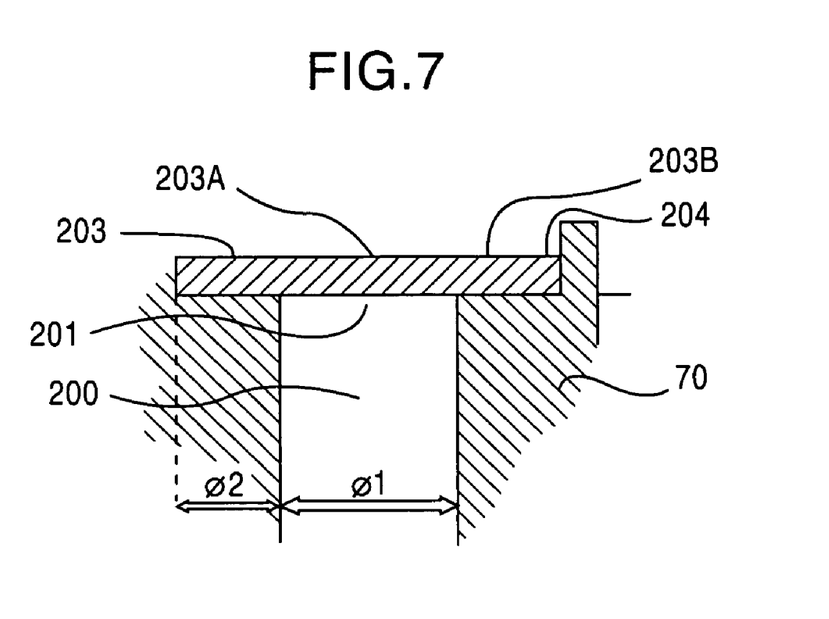
FIG. 7 is a partial enlarged view of the pressure sensor shown in FIG. 6.

FIG. 7 is a partial enlarged view showing the way the seat member 203 is set in position. The seat member 203 is set in a recess 204, which is formed in the surface of the connector case 70. In this state, that part (diameter: φ1) of the seat member 203 which corresponds to the air inlet hole 200 forms an air inlet portion 203A. The outside air is introduced into the interior space 72 through the inlet portion 203A. A peripheral portion 203B (diametrical length: φ2) of the air inlet portion 203A is thermally fused to the connector case 70. The seat member 203 need not always be set on the outside, and may naturally be set inside the connector case 70, that is, in a recess that is formed inside. Besides, the seat member 203 smoothly transmits air and is waterproof and highly water-repellent. If water from the air adheres to its surface, therefore, it never gets into interior space 72 of the sensor.

According to the fifth embodiment arranged in this manner, the air-permeability of the seat member 203 can be maintained to allow the air to be introduced into the interior space 72, and a waterproof pressure sensor can be realized.

Figure 8:
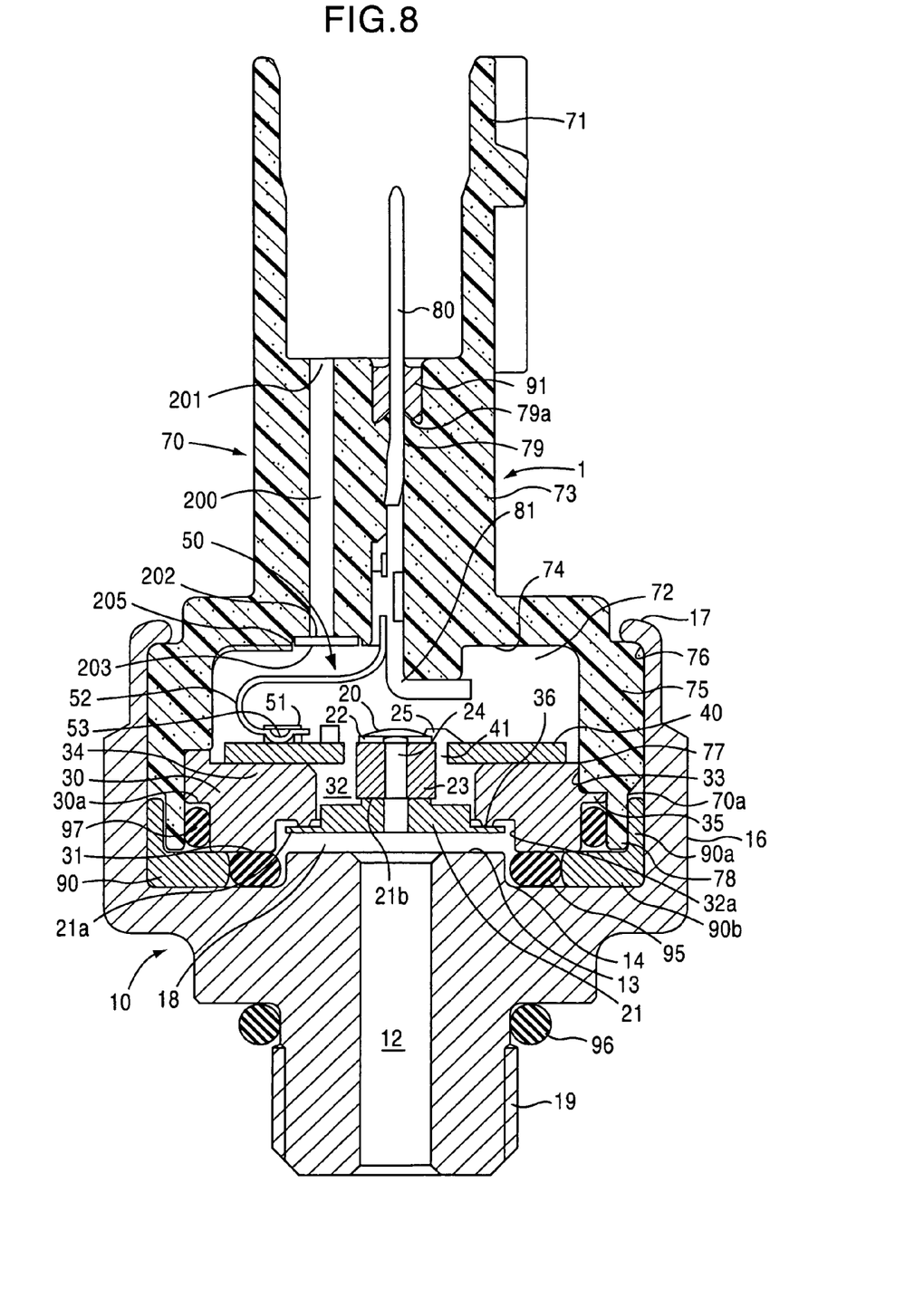
FIG. 8 is a longitudinal sectional view of a pressure sensor according to a sixth embodiment of the invention.

The sixth embodiment of the invention will now be described with reference to FIG. 8. The sixth embodiment differs from the fifth embodiment in that the seat member 203 shown in FIG. 6 is set in the outlet side 202 at the other end of the air inlet hole 200, that is, in the interior space 72. In the description of the sixth embodiment shown in FIG. 8 to follow, like numerals are used to designate like components that are identical with or equivalent to ones according to the first embodiment shown in FIG. 1, and a description of those components is omitted.

In this embodiment, a recess 205 is formed in the surface of a connector case 70 on the interior space side, and the circular seat member 203 is set in the recess 205. In this state, as in the embodiment shown in FIGS. 6 and 7, a peripheral portion 203B of an air inlet portion 203A is fixed by thermocompression bonding.

According to the sixth embodiment arranged in this manner, as in the embodiment shown in FIGS. 6 and 7, the air-permeability of the seat member 203 can be maintained to allow the air to be smoothly introduced into the interior space 72, and a waterproof pressure sensor can be realized. In the thermocompression bonding for the seat members 203 according to the fifth and sixth embodiments, the seat members are heated with a joule heat and fusion-bonded.

What is claimed is:

1. A pressure sensor comprising a housing having a pressure introduction hole, a pressure detecting element formed of a semiconductor device having a piezoelectric resistance effect, a holder for fixing the pressure detecting element, and a connector case, the pressure detecting element and the holder being airtightly joined to form a pressure sensor body in which an interior space is defined, wherein
   a circuit board having an electrode pad is provided on the holder of the pressure sensor body;
   a connector in the connector case and the electrode pad are connected by means of an electrically conductive spring body having elasticity; and
   the holder is supported in the housing by means of a guide frame and a first O-ring and a second O-ring, the holder and the guide frame contacting one another with the first O-ring contacting the holder and the guide frame and the second O-ring contacting the holder and the connector case.

2. The pressure sensor according to claim 1, wherein the holder is located in the connector case with the second O-ring on a side face thereof.

3. The pressure sensor according to claim 1, wherein the guide frame has an L-shaped profile formed of a rising portion and a horizontal portion, said rising portion being interposed between the pressure sensor body and the connector case, and said horizontal portion engaging the holder to support the holder.

4. The pressure sensor according to claim 1, wherein the guide frame has a square profile, and a top surface of the guide frame engages the holder to support the holder.

5. The pressure sensor according to claim 4, wherein the part of the holder in engagement with the guide frame has a lower support portion formed extending on an outer peripheral side.

6. The pressure sensor according to claim 1, wherein the connector projects from the connector case in a manner such that a waterproof filler is located in an area for the projection.

7. The pressure sensor according to claim 1, wherein a fluid oozes out of the connector case rather than gets into the interior space through a gap on an inner surface of the connector case.

8. The pressure sensor according to claim 7, wherein the guide frame has a release groove of a given depth formed penetrating a part of a bottom face thereof.

9. The pressure sensor according to claim 1, wherein the connector case has therein an air inlet hole fitted, at an end portion thereof, with a seat member continuously porous in a thickness direction thereof.

10. The pressure sensor according to claim 9, wherein the seat member is in the form of a circular sheet.

11. The pressure sensor according to claim 9 or 10, wherein the seat member is located on an inlet side of the air inlet hole.

12. The pressure sensor according to claim 9 or 10, wherein the seat member is located on an outlet side of the air inlet hole.

13. The pressure sensor according to claim 10, wherein the seat member is formed of polytetrafluoroethylene resin.

* * * * *